United States Patent
Kondo

(10) Patent No.: US 12,553,630 B2
(45) Date of Patent: Feb. 17, 2026

(54) AIR CONDITIONER

(71) Applicant: FUJITSU GENERAL LIMITED, Kanagawa (JP)

(72) Inventor: Masahiro Kondo, Kawasaki (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 136 days.

(21) Appl. No.: 18/283,581

(22) PCT Filed: Mar. 16, 2022

(86) PCT No.: PCT/JP2022/012063
§ 371 (c)(1),
(2) Date: Sep. 22, 2023

(87) PCT Pub. No.: WO2022/202571
PCT Pub. Date: Sep. 29, 2022

(65) Prior Publication Data
US 2024/0230128 A1    Jul. 11, 2024

(30) Foreign Application Priority Data
Mar. 26, 2021 (JP) .................. 2021-053853

(51) Int. Cl.
*F24F 11/36* (2018.01)
*F24F 11/84* (2018.01)
*F25B 49/00* (2006.01)

(52) U.S. Cl.
CPC ........... *F24F 11/36* (2018.01); *F24F 11/84* (2018.01); *F25B 49/005* (2013.01);
(Continued)

(58) Field of Classification Search
CPC .................. F24F 11/36; F24F 11/84
See application file for complete search history.

(56) References Cited

U.S. PATENT DOCUMENTS

2020/0240686 A1* 7/2020 Yajima ................ F25B 1/00
2020/0271344 A1* 8/2020 Ikeda ................. F24F 11/36
2021/0318041 A1* 10/2021 Wakisaka ............ F25B 41/24

FOREIGN PATENT DOCUMENTS

EP    3 279 580    2/2018
EP    3 287 720    2/2018
(Continued)

OTHER PUBLICATIONS

International Search Report in issued in International Patent Application No. PCT/JP2022/012063, dated May 10, 2022, along with an English translation thereof.
(Continued)

*Primary Examiner* — Henry T Crenshaw
(74) *Attorney, Agent, or Firm* — Greenblum & Bernstein, P.L.C.

(57) ABSTRACT

There is provided an air conditioner with a refrigerant sensor installed in a room, which can reduce the amount of refrigerant leakage while limiting the installation cost of a shut-off valve. The air conditioner includes a liquid-side shut-off valve connected between an outdoor heat exchanger and an indoor unit-side expansion valve, a gas-side shut-off valve connected between an indoor heat exchanger and a compressor, a bypass passage in which one end is connected between the liquid-side shut-off valve and the indoor unit-side expansion valve and the other end is connected between the gas-side shut-off valve and the compressor, and a bypass solenoid valve configured to open and close the bypass passage.

18 Claims, 6 Drawing Sheets

(52) U.S. Cl.
    CPC .  *F25B 2500/222* (2013.01); *F25B 2600/2501* (2013.01); *F25B 2600/2519* (2013.01)

(56) References Cited

FOREIGN PATENT DOCUMENTS

| | | | |
|---|---|---|---|
| GB | 2 565 463 | * | 4/2017 |
| GB | 2554267 | | 3/2018 |
| GB | 2603246 279 580 | | 8/2022 |
| JP | 10-9692 | | 1/1998 |
| JP | 2008-170063 | | 7/2008 |
| JP | 2013-122364 | | 6/2013 |
| WO | 2016/157519 | | 10/2016 |
| WO | 2016/170651 | | 10/2016 |
| WO | 2017/002215 | | 1/2017 |
| WO | 2021/001869 | | 1/2021 |

OTHER PUBLICATIONS

Extended European Search Report issued in Corresponding EP Patent Application No. 22775359.7, dated. Feb. 10, 2025.
Office Action issued in Corresponding CN Patent Application No. 202280023985.2, dated Nov. 19, 2025, along with an English translation thereof.

* cited by examiner

AIR CONDITIONER

TECHNICAL FIELD

The present invention relates to an air conditioner including an outdoor unit, a plurality of indoor units, and a refrigerant detection sensor.

BACKGROUND ART

As a refrigerant leakage detection system that detects refrigerant leakage in so-called multi-air conditioner type air conditioners for buildings and the like, PTL 1 discloses that, in an air conditioner including an outdoor unit and a plurality of indoor units, for each room in the building, the indoor unit, a refrigerant sensor, a refrigerant leak detection device that determines whether there is a refrigerant leak based on the output of the refrigerant sensor, and an alarm configured to issue a warning sound in a case where the refrigerant leakage detection device determines that the refrigerant leakage has occurred, and a safety device configured to operate in a case where the refrigerant leakage detection device determines that the refrigerant leakage has occurred, in which, in a case where whether the refrigerant leakage has occurred is determined by a detection signal from the refrigerant sensor, and the refrigerant leakage has occurred, the refrigerant leakage detection system closes a shut-off valve as a safety device in the room where it is determined that the refrigerant leakage has occurred.

PTL 2 discloses a refrigeration device including a refrigerant circuit including a heat source-side unit (outdoor unit) and a load-side unit (indoor unit) connected through a refrigerant pipe, in which the heat source-side unit includes a compressor, a condenser, a refrigerant tank configured to store the refrigerant condensed by the condenser, and a valve device (shut-off valve) configured to control passing of the refrigerant flowing out of the refrigerant tank, a room in which the load-side unit is arranged includes refrigerant leakage detecting means (refrigerant sensor) that detects the refrigerant leaking from the refrigerant circuit, and the refrigeration device is configured to obtain a detection result from the refrigerant leakage detecting means and, when determining that the refrigerant is leaking, to bring the valve device into a closed state to retain, in the refrigerant tank, the refrigerant being compressed by the compressor and condensed by the condenser.

In the refrigerant leakage detection system described in PTL1, since a shut-off valve as a safety device is provided in each room in which the indoor unit is arranged, the shut-off valve can be closed in a case where the refrigerant leaks in all rooms in which the shut-off valve is arranged. Therefore, it is effective in terms of ensuring safety.

In the refrigeration device disclosed in PTL 2, since the refrigeration device not only simply stops the operation of the compressor when the refrigerant leaks, but also brings the valve device (shut-off valve) into a closed-state to retain, in the refrigerant tank, the refrigerant being compressed by the compressor and condensed by the condenser, it is effective in terms of suppressing the amount of refrigerant leakage.

CITATION LIST

Patent Literatures

PTL 1: WO2017/002215 A1
PTL 2: WO2016/170651 A1

SUMMARY OF INVENTION

Technical Problem

In the refrigerant leakage detection system described in PTL 1, since the shut-off valve as a safety device is provided in each room in which the indoor unit is arranged, it is effective in terms of ensuring safety. However, since the shut-off valve as a safety device is expensive, providing the shut-off valve as a safety device in each room is a factor of cost increase.

On the other hand, in the refrigeration device disclosed in PTL 2, arranging the shut-off valve in the outdoor unit is effective in that the number of shut-off valves can be reduced. However, since the amount of refrigerant remaining on the indoor unit side increases, there is a concern that the amount of leakage to the indoor unit side finally increases. Further, since the refrigeration device brings the valve device (shut-off valve) into a closed-state to retain, in the refrigerant tank, the refrigerant being compressed by the compressor and condensed by the condenser, it is effective in that the amount of refrigerant leakage can be suppressed. However, since the refrigeration device suppresses the amount of refrigerant leakage to the indoor unit side, when a so-called pump-down, in which the refrigerant being compressed by the compressor and condensed by the condenser is retained in the refrigerant tank, is performed, there is a concern that control time is required for the pump-down, during that time, leakage into the indoor space where the load-side unit is arranged continues, which leads to a decrease in safety.

In view of the above problems, the present invention provides an air conditioner including an outdoor unit, a plurality of indoor units, and a refrigerant sensor installed in a room in which the indoor unit is installed, in which the amount of refrigerant leakage can be reduced while limiting the installation cost of a shut-off valve.

Solution to Problem

An aspect of the present invention is an air conditioner that performs an air conditioning operation including an outdoor unit including an outdoor unit-side refrigerant flow path in which a compressor and an outdoor heat exchanger are connected by a refrigerant pipe, an indoor unit-side refrigerant flow path in which a plurality of indoor units, including an indoor unit-side expansion valve and an indoor heat exchanger, are connected in parallel through the refrigerant pipe, a refrigerant circuit in which the outdoor unit-side refrigerant flow path and the indoor unit-side refrigerant flow path are connected so that a refrigerant circulates from the compressor through the outdoor heat exchanger, the indoor unit-side expansion valve, the indoor heat exchanger, and back to the compressor, and a refrigerant detection sensor configured to detect refrigerant leakage into a room in which the indoor unit is installed, the air conditioner comprising: a liquid-side shut-off valve connected between the outdoor heat exchanger and the indoor unit-side expansion valve; a gas-side shut-off valve connected between the indoor heat exchanger and the compressor; a bypass passage in which one end is connected between the liquid-side shut-off valve and the indoor unit-side expansion valve and the other end is connected between the gas-side shut-off valve and the compressor; and a bypass solenoid valve configured to close the bypass passage during the air conditioning operation and open the bypass passage in a case where the refrigerant detection sensor detects the refrigerant leakage.

Advantageous Effects of Invention

The present invention is provided to an air conditioner including an outdoor unit, a plurality of indoor units, and a refrigerant sensor installed in a room in which the indoor unit is installed, in which the amount of refrigerant leakage can be reduced while limiting the installation cost of a shut-off valve.

DESCRIPTION OF EMBODIMENTS

Hereinafter, embodiments of the present invention will be described in detail based on the accompanying drawings. As the embodiment, an air conditioner, in which four indoor units are connected in parallel to the outdoor unit and a cooling operation or a heating operation can be performed in all the indoor units at the same time, will be described by way of an example. The present invention is not limited to the following embodiments, and various modifications can be made without departing from the gist of the present invention.

EXAMPLES

Figure 1:
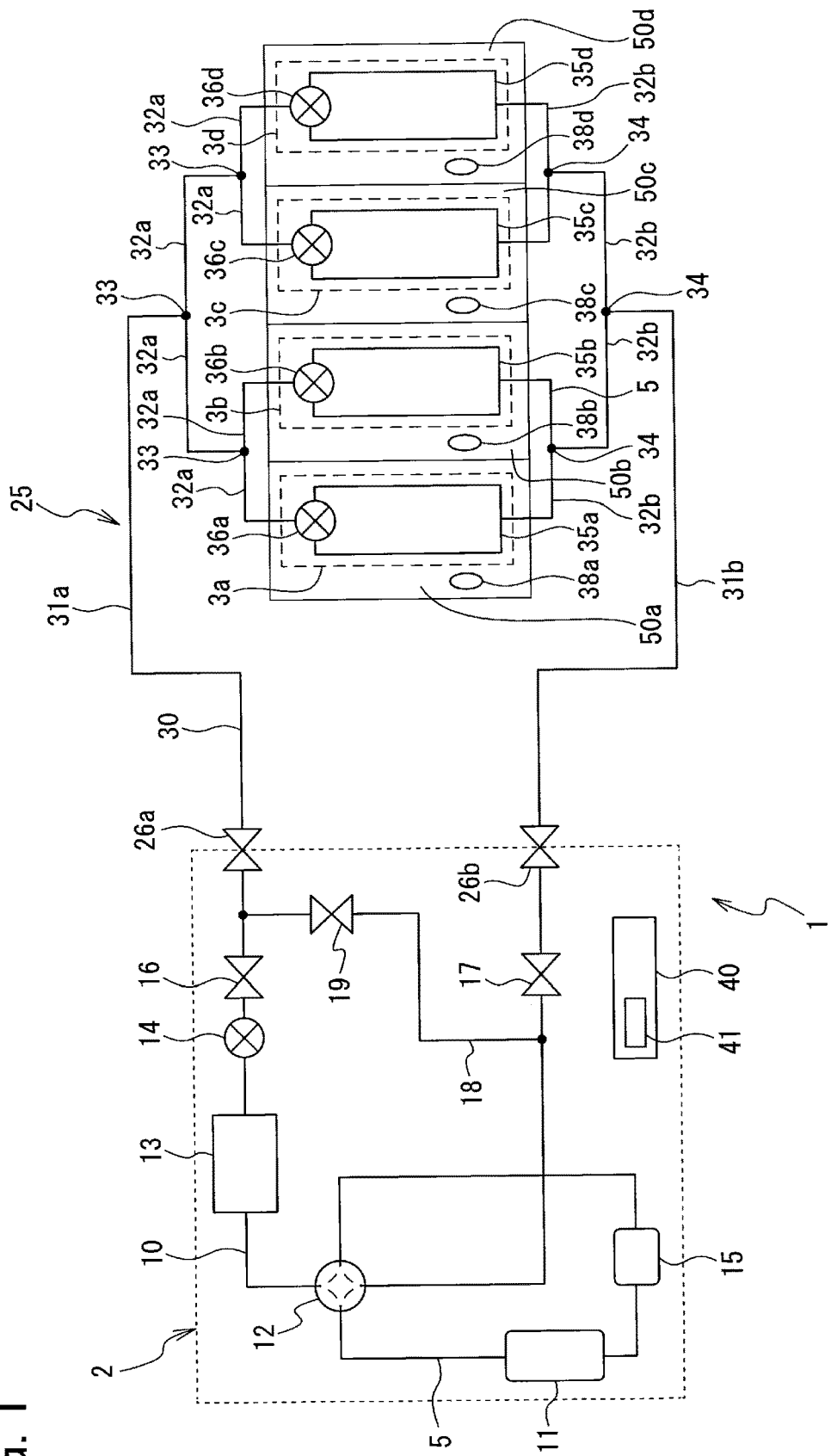
FIG. 1 is a refrigerant circuit diagram of an air conditioner in a first embodiment.

FIG. 1 illustrates a refrigerant circuit diagram of an air conditioner 1 according to a first embodiment of the present invention. The air conditioner 1 is capable of a cooling operation and a heating operation, and includes one outdoor unit 2 arranged outdoors and four indoor units 3a to 3d arranged in rooms 50a to 50d. The outdoor unit 2 includes an outdoor unit-side refrigerant flow path 10 connected by a refrigerant pipe 5, the indoor units 3a to 3d side includes an indoor unit-side refrigerant flow path 30 in which the four indoor units 3a to 3d are connected in parallel through the refrigerant pipe 5. The outdoor unit-side refrigerant flow path 10 and the indoor unit-side refrigerant flow path 30 are connected by a pair of connecting valves 26a and 26b to form a refrigerant circuit 25 through which a refrigerant circulates. In addition, the air conditioner 1 includes refrigerant detection sensors 38a to 38d which are respectively arranged in the rooms 50a to 50d, and the refrigerant detection sensors 38a to 38d are sensors that detect refrigerant leaked from the indoor units 3a to 3d. In the following description, except for special cases, the refrigerant detection sensor will be described as the refrigerant detection sensor 38.

The outdoor unit 2 includes a compressor 11, a four-way valve 12, an outdoor heat exchanger 13, an outdoor unit-side expansion valve 14, an accumulator 15, which are connected to the outdoor unit-side refrigerant flow path 10, and an air blower (not illustrated) for sending outdoor air to the outdoor heat exchanger 13. In the outdoor unit-side refrigerant flow path 10, the four-way valve is connected to the discharge side of the compressor 11, the accumulator 15 is connected to the suction side of the compressor 11, and during the cooling operation, the refrigerant discharged from the compressor 11 is arranged to flow through the four-way valve 12 to the outdoor heat exchanger 13, the outdoor unit-side expansion valve 14, and one connecting valve 26a, and the refrigerant flowing from the other connecting valve 26b is arranged to flow through the four-way valve 12 to the accumulator 15 and the suction side of the compressor 11. Further, during the heating operation, the refrigerant discharged from the compressor 11 is arranged to flow through the four-way valve 12 to the other connecting valve 26b, and the refrigerant flowing from one connecting valve 26a is arranged to flow through the outdoor unit-side expansion valve 14, the outdoor heat exchanger 13, and the four-way valve 12 to the accumulator 15 and the suction side of the compressor 11.

The compressor 11 sucks the refrigerant which circulates through the refrigerant circuit 25 from the suction side, and discharges the compressed refrigerant from the discharge side. As described above, the four-way valve 12 is a switching valve that changes the flow of the refrigerant that circulates during the cooling operation and the heating operation. During the cooling operation, the outdoor heat exchanger 13 is a heat exchanger that exchanges heat between the refrigerant flowing through the four-way valve 12 and passing through the outdoor heat exchanger 13 and the outdoor air, and condenses the refrigerant by dissipating heat to the outdoor air. During the heating operation, the outdoor heat exchanger 13 is a heat exchanger that exchanges heat between the refrigerant flowing from the outdoor unit-side expansion valve 14 and passing through the outdoor heat exchanger 13 and the outdoor air, and evaporates the refrigerant by absorbing heat from the outdoor air. The outdoor unit-side expansion valve 14 has a function of depressurizing the flowed refrigerant, but does not have such a function during the cooling operation, and merely functions as a passage through which the refrigerant passes. During the heating operation, the outdoor unit-side expansion valve 14 is depressurizing means for depressurizing the refrigerant flowing from one connecting valve 26a. The accumulator 15 separates the refrigerant flowing from the four-way valve 12 into gas and liquid, stores the liquid phase refrigerant, and sends the gas phase refrigerant to the suction side of the compressor 11.

The four indoor units 3a to 3d are connected in parallel to the indoor unit-side refrigerant flow path 30. The indoor unit 3a includes an indoor unit-side expansion valve 36a, an indoor heat exchanger 35a, and an air blower (not illustrated) for sending indoor air to the indoor heat exchanger 35a. Similarly, the indoor unit 3b includes an indoor unit-side expansion valve 36b, an indoor heat exchanger 35b, and an air blower (not illustrated), and the same applies to the other indoor units 3c and 3d. In the following description, except for special cases, the indoor unit, the indoor heat exchanger, and the indoor unit-side expansion valve will be described as the indoor unit 3, the indoor heat exchanger 35, and the indoor unit-side expansion valve 36.

The indoor unit-side refrigerant flow path 30 includes a pair of connecting pipes 31a and 31b, and one connecting pipe 31a has one end connected to one connecting valve 26a, and the other end, which serves as a liquid-side branch portion 33, to which a plurality of branch pipes 32a is connected. The other connecting pipe 31b has one end connected to the other connecting valve 26b, and the other end, which serves as a gas-side branch portion 34, to which a plurality of branch pipes 32b is connected. In the present embodiment, the liquid-side branch portion 33 is divided into two branch pipes 32a, each of the two branch pipes 32a is further divided into two branch pipes 32a through the liquid-side branch portion 33, and the four branch pipes 32a are arranged on the terminal side. The same applies to the other connecting pipe 31b, and the gas-side branch portion 34 is divided into two branch pipes 32b, and each of the two branch pipes 32b is further divided into two branch pipes 32b through the gas-side branch portion 34, and the four branch pipes 32b are arranged on the terminal side. The indoor unit-side expansion valve 36 and the indoor heat exchanger 35 are arranged between the branch pipe 32a and the branch pipe 32b. Specifically, the branch pipe 32a is connected to the indoor unit-side expansion valve 36, the indoor unit-side expansion valve 36 is connected to the indoor heat exchanger 35, and the indoor heat exchanger 35 is connected to the branch pipe 32b.

During the cooling operation, the flow of the refrigerant in the indoor unit-side refrigerant flow path 30 flows from one connecting valve 26a through the connecting pipe 31a and branch pipe 32a to the indoor unit-side expansion valve 36 and then to the indoor heat exchanger 35, and then flows through the branch pipe 32b and the connecting pipe 31b to the other connecting valve 26b. During the heating operation, the flow of the refrigerant in the indoor unit-side refrigerant flow path 30 flows from the other connecting valve 26b through the connecting pipe 31b and the branch pipe 32b to the indoor heat exchanger 35 and then to the indoor unit-side expansion valve 36, and then flows through the branch pipe 32a and the connecting pipe 31a to one connecting valve 26a.

During the cooling operation, the indoor unit-side expansion valve 36 functions as depressurizing means for depressurizing the flowing refrigerant. During the heating operation, the indoor unit-side expansion valve 36 does not function as depressurizing means, but merely functions as a passage through which the refrigerant passes. During the cooling operation, the indoor heat exchanger 35 exchanges heat between the refrigerant flowing through the indoor unit-side expansion valve 36 and passing through the indoor heat exchanger 35 and the indoor air, and evaporates the refrigerant by absorbing heat from the indoor air. During the heating operation, the indoor heat exchanger 35 exchanges heat between the refrigerant flowing from the other connecting valve 26b and passing through the indoor heat exchanger 35 and the indoor air, and condenses the refrigerant by dissipating heat to the indoor air.

The refrigerant circuit 25 is further provided with a liquid-side shut-off valve 16, a gas-side shut-off valve 17, a bypass passage 18, and a bypass solenoid valve 19. The liquid-side shut-off valve 16 is connected to the refrigerant pipe 5 between the outdoor unit-side expansion valve 14 and one connecting valve 26a, and the gas-side shut-off valve 17 is connected to the refrigerant pipe 5 between the four-way valve 12 and the other connecting valve 26b. The liquid-side shut-off valve 16 and the gas-side shut-off valve 17 are in an open state at all times, allowing the passage of the refrigerant, and will be described in detail later, but the liquid-side shut-off valve 16 and the gas-side shut-off valve 17 are in a closed state, in a case where the refrigerant detection sensor 38 detects refrigerant leakage. The bypass passage 18 has one end connected to the refrigerant pipe 5 between the liquid-side shut-off valve 16 and one connecting valve 26a, and the other end connected to the refrigerant pipe 5 between the four-way valve 12 and the gas-side shut-off valve 17. The bypass solenoid valve 19 is connected to the bypass passage 18 and is in a closed state at all times, and will be described in detail later, the bypass solenoid valve 19 is in an open state where the refrigerant can pass through, in a case where the refrigerant detection sensor 38 detects the refrigerant leakage.

The air conditioner 1 includes control means 40 that controls the outdoor unit 2 and the indoor unit 3 to perform a cooling operation and a heating operation. Specifically, based on various sensors (not illustrated), the control means 40 controls the compressor 11, the four-way valve 12, the outdoor unit-side expansion valve 14, and the air blower (not illustrated) for sending outdoor air to the outdoor heat exchanger 13, which are arranged in the outdoor unit 2, and controls the indoor unit-side expansion valve 36 and the air blower (not illustrated) for sending outdoor air to the indoor heat exchanger 35, which are arranged in the indoor unit 3. Further, the control means 40 controls the liquid-side shut-off valve 16, the gas-side shut-off valve 17, and the bypass solenoid valve 19 based on the refrigerant detection sensor 38.

Figure 2:
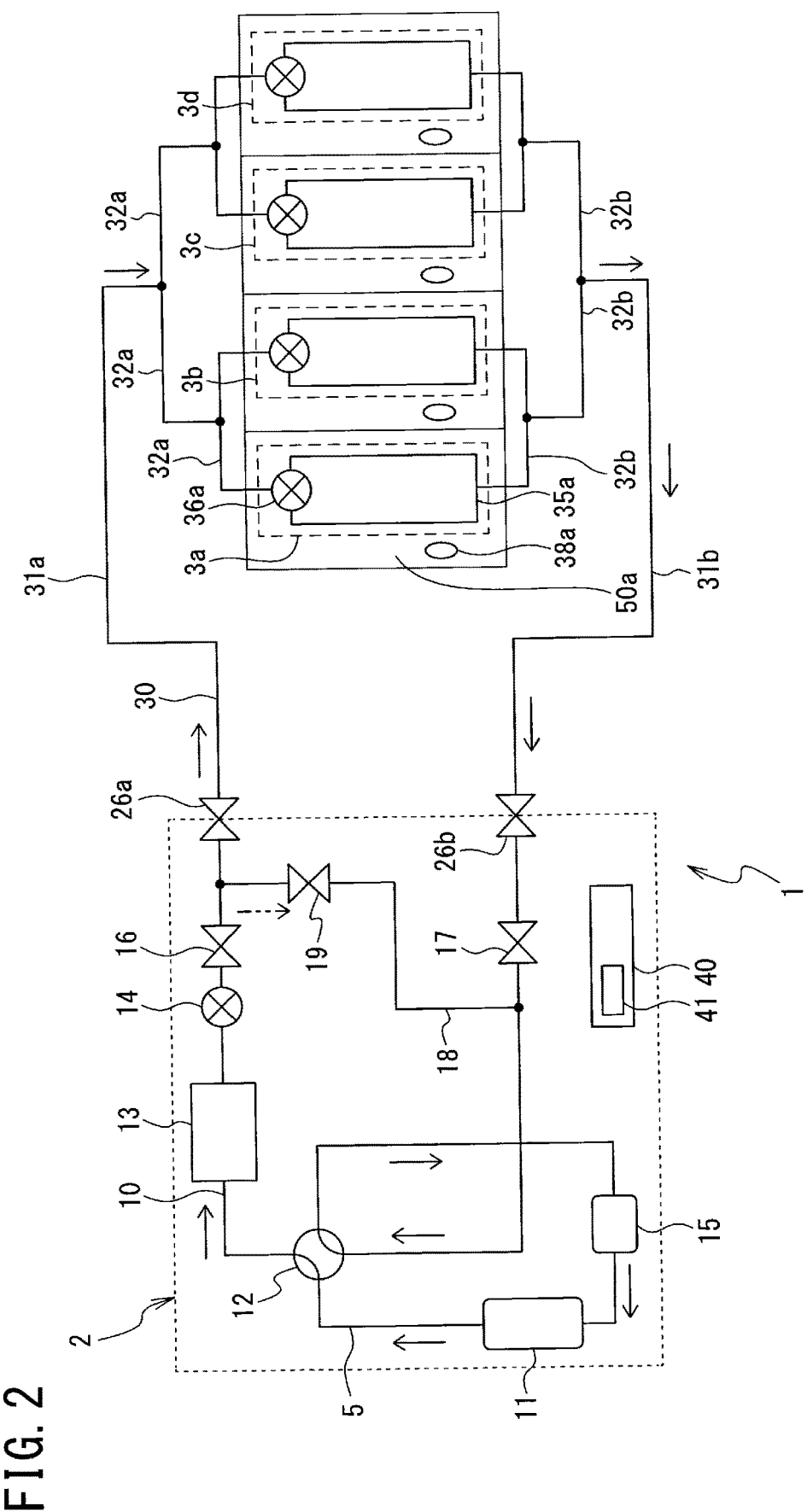
FIG. 2 is a refrigerant circuit diagram of the air conditioner during a cooling operation in the first embodiment.

Next, the flow of the refrigerant during the cooling operation of the refrigerant circuit 25 will be described with reference to FIG. 2. The arrow in FIG. 2 indicates a direction of the flow of the refrigerant. During the cooling operation, the high-temperature and high-pressure gas refrigerant discharged from the compressor 11 flows through the four-way valve 12 and passes through the outdoor heat exchanger 13 and when passing through the outdoor heat exchanger 13, the refrigerant is condensed and becomes a high-pressure liquid refrigerant. The high-pressure liquid refrigerant passes through the outdoor unit-side expansion valve 14, the liquid-side shut-off valve 16, one connecting valve 26a, one connecting pipe 31a, the branch pipe 32a, the indoor unit-side expansion valves 36a to 36d, and the indoor heat exchangers 35a to 35d. The high-pressure liquid refrigerant is depressurized when passing through the indoor unit-side expansion valves 36a to 36d, absorbs heat when passing through the indoor heat exchangers 35a to 35d and becomes a gas refrigerant, passes through the branch pipe 32b, the other connecting pipe 31b, the other connecting valve 26b, and the gas-side shut-off valve 17, flows through the four-way valve 12 to the accumulator 15, and is sucked into the compressor 11. In other words, during the cooling operation, the refrigerant is a high-pressure liquid refrigerant between the outdoor heat exchanger 13 and the indoor unit-side expansion valves 36a to 36d, and a low-pressure gas refrigerant between the indoor heat exchangers 35a to 35d and the compressor 11. Therefore, during the cooling operation, one end of the bypass passage 18 is connected to a refrigerant pipe through which the high-pressure liquid refrigerant flows, and the other end of the bypass passage 18 is connected to a refrigerant pipe through which the low-pressure gas refrigerant flows.

Figure 3:
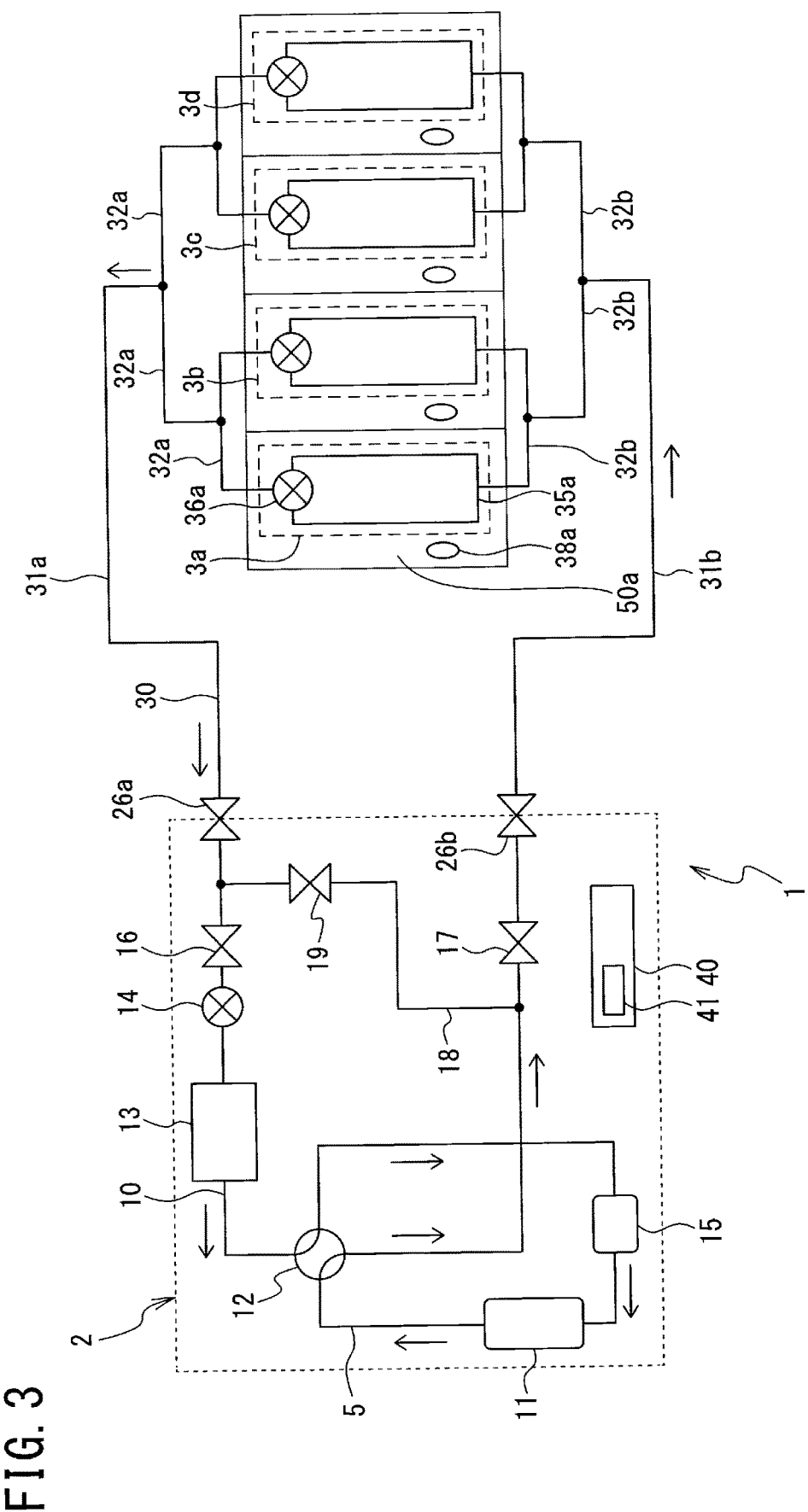
FIG. 3 is a refrigerant circuit diagram of the air conditioner during a heating operation in the first embodiment.

The flow of the refrigerant during the heating operation of the refrigerant circuit 25 will be described with reference to FIG. 3. The arrow in FIG. 3 indicates a direction of the flow of the refrigerant. During the heating operation, the high-temperature and high-pressure gas refrigerant discharged from the compressor 11 flows through the four-way valve 12 and passes through the gas-side shut-off valve 17, the other connecting valve 26b, the other connecting pipe 31b, the branch pipe 32b, and the indoor heat exchangers 35a to 35d. The high-temperature and high-pressure gas refrigerant is condensed by dissipating heat when passing through the indoor heat exchangers 35a to 35d, and becomes a high-pressure liquid refrigerant. The high-pressure liquid refrigerant passes through the indoor unit-side expansion valves 36a to 36d, the branch pipe 32a, one connecting pipe 31a, one connecting valve 26a, the liquid-side shut-off valve 16, the outdoor unit-side expansion valve 14, and the outdoor heat exchanger 13. The high-pressure refrigerant is depressurized when passing through the outdoor unit-side expansion valve 14 and absorbs heat when passing through the outdoor heat exchanger 13 and becomes a low-pressure gas refrigerant. The low-pressure gas refrigerant is sucked into the compressor 11 through the four-way valve 12 and the accumulator 15. In other words, during the heating operation, the refrigerant is a high-pressure gas refrigerant between the compressor 11 and the indoor heat exchangers 35a to 35d, the refrigerant is a high-pressure liquid refrigerant between the indoor heat exchangers 35a to 35d and the liquid-side shut-off valve 16, and the refrigerant is a low-pressure gas refrigerant between the outdoor heat exchanger 13 and the compressor 11. Therefore, during the heating operation, one end of the bypass passage 18 is connected to a refrigerant pipe through which the high-pressure liquid refrigerant flows, and the other end of the bypass passage 18 is connected to a refrigerant pipe through which the high-pressure gas refrigerant flows.

Next, an operation in a case where any of the refrigerant detection sensors 38a to 38d detects refrigerant leakage during the cooling operation will be described. In the present embodiment, as an example, a case where the refrigerant detection sensor 38a of the indoor unit 3a detects refrigerant leakage will be described. When the refrigerant leaks in the room 50a and the refrigerant detection sensor 38a of the indoor unit 3a detects the refrigerant leakage, the control means 40 stops the compressor 11 and then closes all the indoor unit-side expansion valves 36a to 36d. As a result of this operation, since the high-pressure refrigerant is not sent to the indoor unit 3a where the refrigerant leakage occurred, the amount of refrigerant leakage can be reduced. Next, the liquid-side shut-off valve 16 and the gas-side shut-off valve 17 are closed, and then the bypass solenoid valve 19 is opened. As a result of this operation, during the cooling operation, since one end of the bypass passage 18 is connected to a refrigerant pipe through which the high-pressure liquid refrigerant flows, and the other end of the bypass passage 18 is connected to a refrigerant pipe through which the low-pressure gas refrigerant flows, the refrigerant flows through the bypass passage 18 as indicated by the dashed arrow in FIG. 2. As described above, in a case where the refrigerant leakage occurred on the indoor unit 3 side during the cooling operation, the liquid refrigerant in the refrigerant pipe 5 can be recovered to the outdoor unit 2 side by using the high-low pressure difference of the refrigerant. Therefore, the amount of refrigerant leakage can be reduced.

Next, an operation in a case where any of the refrigerant detection sensors 38a to 38d detects refrigerant leakage during the heating operation will be described. In the present embodiment, as an example, a case where the refrigerant detection sensor 38a of the indoor unit 3a detects refrigerant leakage will be described. When the refrigerant leaks in the room 50a and the refrigerant detection sensor 38a of the indoor unit 3a detects the refrigerant leakage, the control means 40 stops the compressor 11 and then closes the gas-side shut-off valve 17. As a result of this operation, since the high-pressure refrigerant is not sent to the indoor unit 3a where the refrigerant leakage occurred, the amount of refrigerant leakage can be reduced. Next, all the indoor unit-side expansion valves 36a to 36d and the liquid-side shut-off valve 16 are closed. As a result of this operation, since the high-pressure refrigerant is not sent from one connecting pipe 31a to the indoor unit 3a where the refrigerant leakage occurred, the amount of refrigerant leakage can be reduced. During the heating operation, since one end of the bypass passage 18 is connected to a refrigerant pipe through which the high-pressure liquid refrigerant flows, and the other end of the bypass passage 18 is connected to a refrigerant pipe through which the high-pressure gas refrigerant flows, it is not possible to recover the liquid refrigerant in the refrigerant pipe to the outdoor unit side by using the high-low pressure difference of the refrigerant as in the case of cooling operation, but the high-pressure liquid refrigerant having high density can be prevented from being sent to the indoor unit 3a where the refrigerant leakage has occurred by closing all the indoor unit-side expansion valves 36a to 36d and the liquid-side shut-off valve 16, thereby enabling reducing the amount of refrigerant leakage.

In addition, the control means 40 includes the differential pressure calculating means 41 for calculating the high-low pressure difference of the refrigerant circuit 25. The high-low pressure difference of the refrigerant circuit 25 can be detected by providing pressure sensors (not illustrated) on the inlet side and the outlet side of the indoor heat exchanger 35. The high-low pressure difference of the refrigerant circuit 25 can also be calculated by the saturation pressure from the intermediate temperature of the indoor heat exchanger 35. Next, an operation in a case where the differential pressure calculating means 41 is used when the refrigerant detection sensor 38a detects refrigerant leakage will be described. When the refrigerant detection sensor 38a of the indoor unit 3a detects the refrigerant leakage, the control means 40 calculates the high-low pressure difference of the refrigerant circuit 25 using the differential pressure calculating means 41. Next, it is determined whether the calculated high-low pressure difference of the refrigerant circuit 25 is less than a predetermined threshold value (predetermined value). In a case where the calculated high-low pressure difference of the refrigerant circuit 25 is less than a predetermined threshold value, a differential pressure securing operation to operate the compressor 11 is executed until the calculated high-low pressure difference of the refrigerant circuit 25 is equal to or greater than a predetermined threshold value. In a case where the calculated high-low pressure difference of the refrigerant circuit 25 is equal to or greater than a predetermined threshold value due to the execution of the differential pressure securing operation, the compressor 11 is stopped. Subsequent operations execute the above-described operations.

The invention of the present embodiment is to recover the liquid refrigerant in the refrigerant pipe to the outdoor unit side by using the high-low pressure difference of the refrigerant in a case where the refrigerant leaks in the room 50. However, since the high-low pressure difference of the refrigerant circuit 25 is small in a case where the air conditioning operation is stopped or in a case where the air conditioning operation is at low capacity, the recovery of the liquid refrigerant in the refrigerant pipe to the outdoor unit side by using the high-low pressure difference of the refrigerant cannot be executed sufficiently. However, by using the differential pressure calculating means 41 for calculating the high-low pressure difference of the refrigerant circuit 25 to perform the above-described operations, the high-low pressure difference of the refrigerant circuit 25 can be made and the liquid refrigerant in the refrigerant pipe can be recovered to the outdoor unit side by using the high-low pressure difference of the refrigerant.

Figure 4:
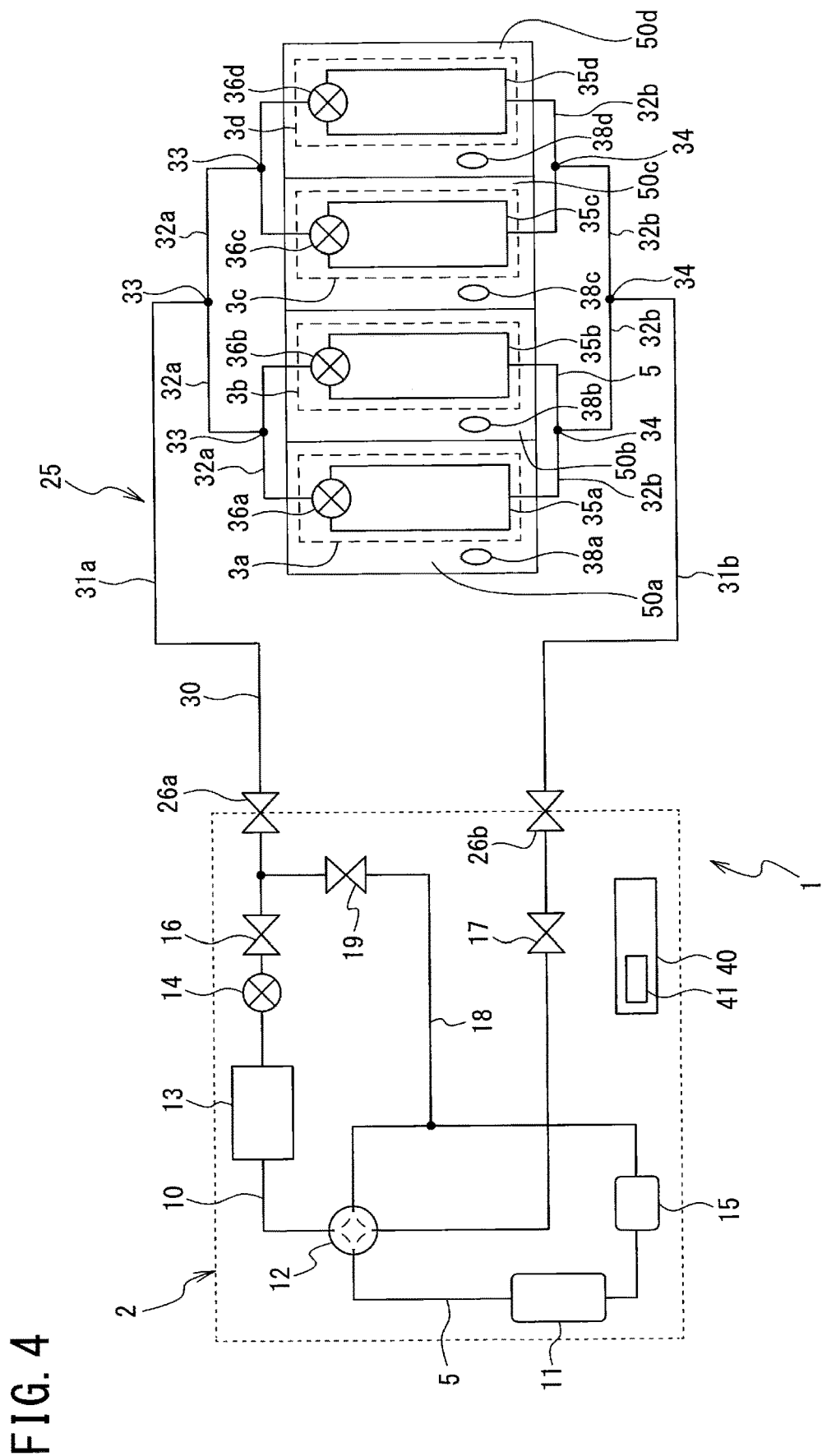
FIG. 4 is a refrigerant circuit diagram of an air conditioner in a second embodiment.
Figure 5:
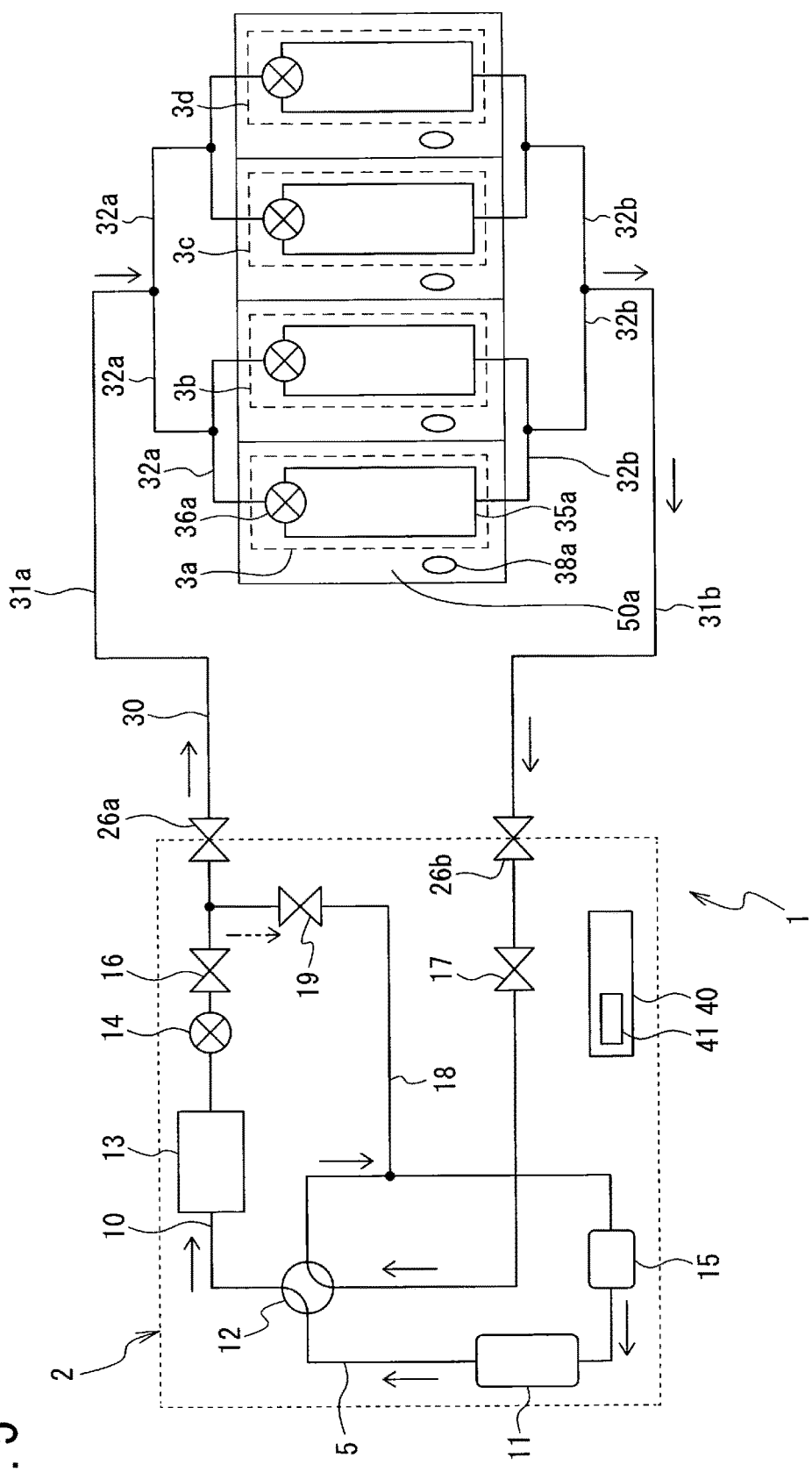
FIG. 5 is a refrigerant circuit diagram of the air conditioner during a cooling operation in the second embodiment.
Figure 6:
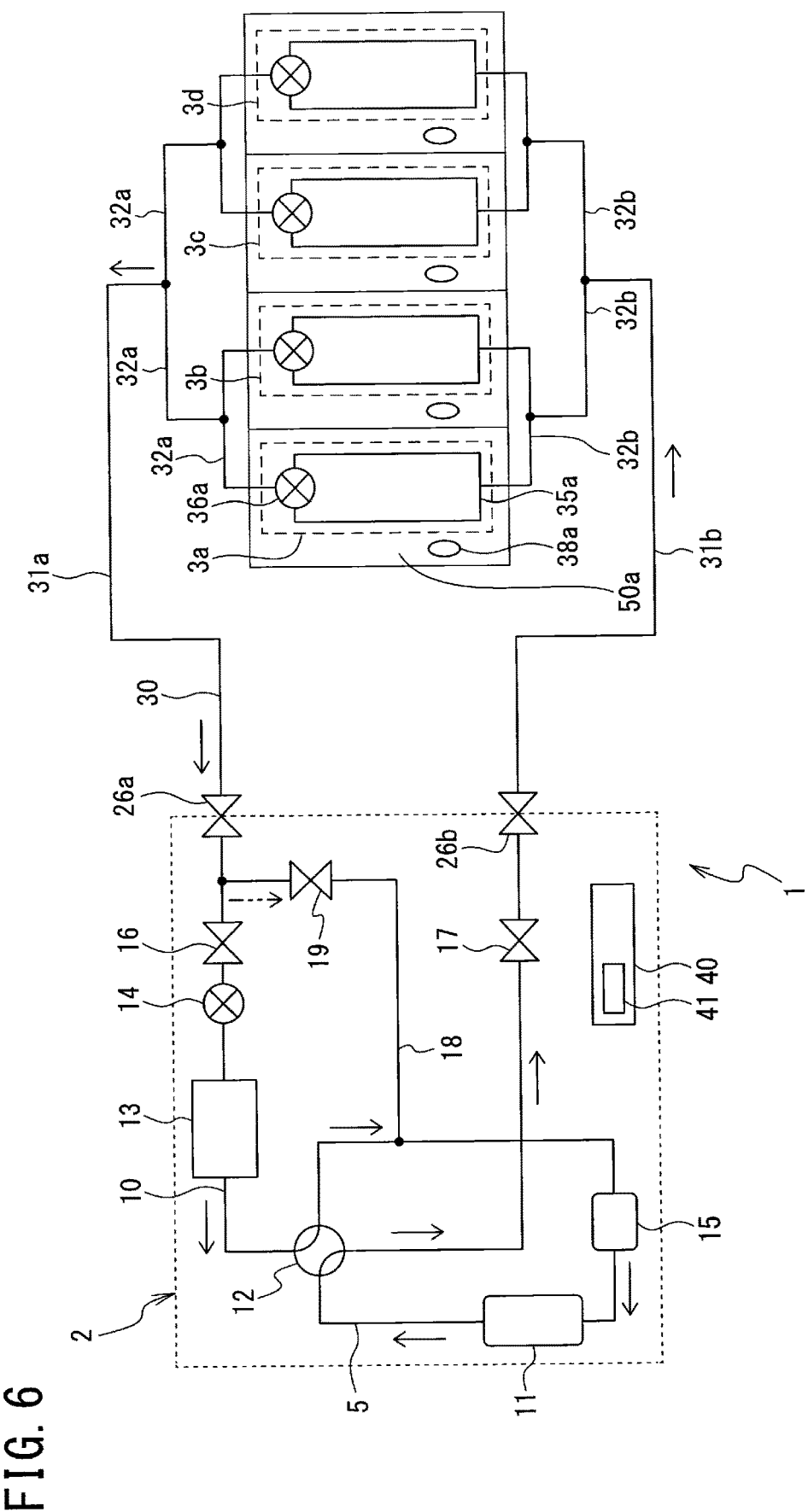
FIG. 6 is a refrigerant circuit diagram of the air conditioner during a heating operation in the second embodiment.

Next, a second embodiment will be described with reference to FIGS. 4 to 6. The difference between the air conditioner 1 according to the second embodiment and the air conditioner 1 according to the first embodiment is that the other end of the bypass passage 18 is connected to the refrigerant pipe 5 between the four-way valve 12 and the compressor 11, unlike the air conditioner 1 according to the first embodiment, and the other configurations are the same as those of the air conditioner 1 according to the first embodiment. Hereinafter, the configurations common to the air conditioner 1 according to the first embodiment will be represented by the same reference numerals, and the description of the configurations common to the air conditioner 1 according to the first embodiment will be omitted. FIG. 5 is the flow of the refrigerant during the cooling operation of the refrigerant circuit 25, and the arrow indicates a direction of the flow of the refrigerant. FIG. 6 is the flow of the refrigerant during the heating operation of the refrigerant circuit 25, and the arrow indicates a direction of the flow of the refrigerant.

The bypass passage 18 has one end connected to the refrigerant pipe 5 between the liquid-side shut-off valve 16 and one connecting valve 26a, and the other end connected to the refrigerant pipe 5 between the four-way valve 12 and the compressor 11. During the cooling operation, the refrigerant is a high-pressure liquid refrigerant between the outdoor heat exchanger 13 and the indoor unit-side expansion valves 36a to 36d, and a low-pressure gas refrigerant between the indoor heat exchangers 35a to 35d and the compressor 11. Therefore, during the cooling operation, one end of the bypass passage 18 is connected to a refrigerant pipe through which the high-pressure liquid refrigerant flows, and the other end of the bypass passage 18 is connected to a refrigerant pipe through which the low-pressure gas refrigerant flows.

During the heating operation, the refrigerant is a high-pressure gas refrigerant between the compressor 11 and the indoor heat exchangers 35a to 35d, the refrigerant is a high-pressure liquid refrigerant between the indoor heat exchangers 35a to 35d and the liquid-side shut-off valve 16, and the refrigerant is a low-pressure gas refrigerant between the outdoor heat exchanger 13 to the compressor 11. Therefore, during the heating operation, one end of the bypass passage 18 is connected to the refrigerant pipe through which the high-pressure liquid refrigerant flows, and the other end of the bypass passage 18 is connected to the refrigerant pipe through which the low-pressure gas refrigerant flows. Therefore, unlike the air conditioner 1 according to the first embodiment, during the cooling operation and the heating operation, one end of the bypass passage 18 is connected to the refrigerant pipe through which the high-pressure liquid refrigerant flows, and the other end of the bypass passage 18 is connected to the refrigerant pipe through which the low-pressure gas refrigerant flows.

Next, an operation in a case where any of the refrigerant detection sensors 38a to 38d detects refrigerant leakage during the cooling operation will be described. In the present embodiment, as an example, a case where the refrigerant detection sensor 38a of the indoor unit 3a detects refrigerant leakage will be described. When the refrigerant leaks in the room 50a and the refrigerant detection sensor 38a of the indoor unit 3a detects the refrigerant leakage, the control means 40 stops the compressor 11 and then closes all the indoor unit-side expansion valves 36a to 36d. As a result of this operation, since the high-pressure refrigerant is not sent to the indoor unit 3a where the refrigerant leakage occurred, the amount of refrigerant leakage can be reduced. Next, the liquid-side shut-off valve 16 and the gas-side shut-off valve 17 are closed, and then the bypass solenoid valve 19 is opened. As a result of this operation, during the cooling operation, since one end of the bypass passage 18 is connected to a refrigerant pipe through which the high-pressure liquid refrigerant flows, and the other end of the bypass passage 18 is connected to a refrigerant pipe through which the low-pressure gas refrigerant flows, the refrigerant flows through the bypass passage 18 as indicated by the dashed arrow in FIG. 5. As described above, in a case where the refrigerant leakage occurred on the indoor unit 3 side during the cooling operation, the liquid refrigerant in the refrigerant pipe can be recovered to the outdoor unit side by using the high-low pressure difference of the refrigerant. Therefore, the amount of refrigerant leakage can be reduced.

Next, an operation in a case where any of the refrigerant detection sensors 38a to 38d detects refrigerant leakage during the heating operation will be described. In the present embodiment, as an example, a case where the refrigerant detection sensor 38a of the indoor unit 3a detects refrigerant leakage will be described. When the refrigerant leaks in the room 50a and the refrigerant detection sensor 38a of the indoor unit 3a detects the refrigerant leakage, the control means 40 stops the compressor 11 and then closes the gas-side shut-off valve 17. As a result of this operation, since the high-pressure refrigerant is not sent to the indoor unit 3a where the refrigerant leakage occurred, the amount of refrigerant leakage can be reduced. Next, all the indoor unit-side expansion valves 36a to 36d and the liquid-side shut-off valve 16 are closed. As a result of this operation, since the high-pressure liquid refrigerant is not sent to the indoor unit 3a where the refrigerant leakage occurred, the amount of refrigerant leakage can be reduced. Next, the bypass solenoid valve 19 is opened. As a result of this operation, during the heating operation, since one end of the bypass passage 18 is connected to a refrigerant pipe through which the high-pressure liquid refrigerant flows, and the other end of the bypass passage 18 is connected to a refrigerant pipe through which the low-pressure gas refrigerant flows, the refrigerant flows through the bypass passage 18 as indicated by the dashed arrow in FIG. 6. As described above, in a case where the refrigerant leakage occurred on the indoor unit 3 side during the heating operation, the liquid refrigerant in the refrigerant pipe can be recovered to the outdoor unit side by using the high-low pressure difference of the refrigerant. Therefore, the amount of refrigerant leakage can be reduced. Therefore, in the second embodiment, unlike the first embodiment, in a case where any of the refrigerant detection sensors 38a to 38d detects the refrigerant leakage during the cooling operation and the heating operation, the liquid refrigerant in the refrigerant pipe can be recovered to the outdoor unit side by using the high-low pressure difference of the refrigerant.

In the embodiment described above, the liquid-side shut-off valve 16 is connected to the refrigerant pipe 5, which is on the outdoor unit-side refrigerant flow path 10, between the outdoor unit-side expansion valve 14 and one connecting valve 26a, and the gas-side shut-off valve 17 is connected to the refrigerant pipe 5, which is on the outdoor unit-side refrigerant flow path 10, between the four-way valve 12 and the other connecting valve 26b, but the liquid-side shut-off valve 16 and the gas-side shut-off valve 17 may be connected on the indoor unit-side refrigerant flow path 30. Specifically, the liquid-side shut-off valve 16 may be connected to the refrigerant pipe 5 between one connecting valve 26a and the liquid-side branch portion 33, and the gas-side shut-off valve 17 may be connected to the refrigerant pipe 5 between the other connecting valve 26b and the gas-side branch portion 34. In this case, the bypass passage 18 has one end connected to the refrigerant pipe 5 between the liquid-side shut-off valve 16 and the liquid-side branch portion 33, and the other end is connected to the refrigerant pipe 5, which is on the indoor unit-side refrigerant flow path 30, between the four-way valve 12 and the gas-side shut-off valve 17. As a result, since the distance of the refrigerant pipe from the indoor unit 3 where refrigerant leakage occurs to the liquid-side shut-off valve 16 and to the gas-side shut-off valve 17 is shorter than a case where the liquid-side shut-off valve 16 and the gas-side shut-off valve 17 are connected to the outdoor unit-side refrigerant flow path 10, the amount of refrigerant leakage can be reduced.

In the above-described embodiment, by using two shut-off valves consisting of a liquid-side shut-off valve 16 connected between the outdoor heat exchanger 13 and the indoor unit-side expansion valve 36 and a gas-side shut-off valve 17 connected between the indoor heat exchanger 35 and the compressor 11, the bypass passage 18 where one side is connected between the liquid-side shut-off valve 16 and the indoor unit-side expansion valve 36 and the other side is connected between the gas-side shut-off valve 17 and the compressor 11, and the bypass solenoid valve 19 which closes the bypass passage 18 during the air conditioning operation, and opens the bypass passage 18 in a case where the refrigerant detection sensor 38 detects refrigerant leakage, it is not necessary to provide a large number of shut-off valves. Therefore, the amount of refrigerant leakage can be reduced while limiting the installation cost of the shut-off valves.

Although the present invention has been described with reference to the definite number of embodiments, the scope of the present invention is not limited thereto and modifications of the embodiments based on the above disclosure are obvious to those skilled in the art.

REFERENCE SIGNS LIST 1 air conditioner
2 outdoor unit
3a to 3d indoor unit
5 refrigerant pipe
10 outdoor unit-side refrigerant flow path
11 compressor
12 four-way valve
13 outdoor heat exchanger
14 outdoor unit-side expansion valve
15 accumulator
16 liquid-side shut-off valve
17 gas-side shut-off valve
18 bypass passage
19 bypass solenoid valve
25 refrigerant circuit
26a, 26b connecting valve
30 indoor unit-side refrigerant flow path
31a, 31b connecting pipe
32a, 32b branch pipe
33 liquid-side branch portion
34 gas-side branch portion
35a to 35d indoor heat exchanger
36a to 36d indoor unit-side expansion valve
38a to 38d refrigerant detection sensor
40 control means
41 differential pressure calculating means
50a to 50d room

The invention claimed is:

1. An air conditioner that performs an air conditioning operation including
   an outdoor unit including an outdoor unit-side refrigerant flow path in which a compressor and an outdoor heat exchanger are connected by a refrigerant pipe,
   an indoor unit-side refrigerant flow path in which a plurality of indoor units, including an indoor unit-side expansion valve and an indoor heat exchanger, are connected in parallel through the refrigerant pipe,
   a refrigerant circuit in which the outdoor unit-side refrigerant flow path and the indoor unit-side refrigerant flow path are connected so that a refrigerant circulates from the compressor through the outdoor heat exchanger, the indoor unit-side expansion valve, the indoor heat exchanger, and back to the compressor, and
   a refrigerant detection sensor configured to detect refrigerant leakage into a room in which the indoor unit is installed,
   the air conditioner comprising:
   a liquid-side shut-off valve connected between the outdoor heat exchanger and the indoor unit-side expansion valve;
   a gas-side shut-off valve connected between the indoor heat exchanger and the compressor;
   a bypass passage in which one end is connected between the liquid-side shut-off valve and the indoor unit-side expansion valve and the other end is connected between the gas-side shut-off valve and the compressor; and
   a bypass solenoid valve configured to close the bypass passage during the air conditioning operation and open the bypass passage in a case where the refrigerant detection sensor detects the refrigerant leakage,
   wherein each of the plurality of indoor units is respectively connected to one of a plurality of the refrigerant pipes through a branch portion, such that the plurality of indoor units are connected in parallel, and the branch portion is provided in the indoor unit-side refrigerant flow path,
   the liquid-side shut-off valve is connected between the outdoor heat exchanger and the branch portion,
   the gas-side shut-off valve is connected between the compressor and the branch portion, and
   the one end of the bypass passage is connected between the liquid-side shut-off valve and the branch portion.

2. The air conditioner according to claim 1, in which a cooling operation and a heating operation are operable, further comprising:
   an outdoor unit-side expansion valve connected between the outdoor heat exchanger and the liquid-side shut-off valve; and
   a four-way valve connected between the compressor and the outdoor heat exchanger to switch a connection between a discharge side of the compressor and the outdoor heat exchanger or a connection between a suction side of the compressor and the outdoor heat exchanger,
   wherein, during the cooling operation, the refrigerant flows from the compressor through the four-way valve, the outdoor heat exchanger, the outdoor unit-side expansion valve, the liquid-side shut-off valve, the indoor unit-side refrigerant flow path, the gas-side shut-off valve, the four-way valve, and back to the compressor, during the heating operation, the refrigerant flows from the compressor through the four-way valve, the gas-side shut-off valve, the indoor unit-side refrigerant flow path, the liquid-side shut-off valve, the outdoor unit-side expansion valve, the outdoor heat exchanger, the four-way valve, and back to the compressor, and the other end of the bypass passage is connected between the gas-side shut-off valve and the four-way valve.

3. The air conditioner according to claim 1, in which a cooling operation and a heating operation are operable, further comprising:

an outdoor unit-side expansion valve connected between the outdoor heat exchanger and the liquid-side shut-off valve; and a four-way valve connected between the compressor and the outdoor heat exchanger to switch a connection between a discharge side of the compressor and the outdoor heat exchanger or a connection between a suction side of the compressor and the outdoor heat exchanger, wherein, during the cooling operation, the refrigerant flows from the compressor through the four-way valve, the outdoor heat exchanger, the outdoor unit-side expansion valve, the liquid-side shut-off valve, the indoor unit-side refrigerant flow path, the gas-side shut-off valve, the four-way valve, and back to the compressor, during the heating operation, the refrigerant flows from the compressor through the four-way valve, the gas-side shut-off valve, the indoor unit-side refrigerant flow path, the liquid-side shut-off valve, the outdoor unit-side expansion valve, the outdoor heat exchanger, the four-way valve, and back to the compressor, and the other end of the bypass passage is connected between the four-way valve and the compressor.

4. The air conditioner according to claim 1, wherein the liquid-side shut-off valve is connected between the outdoor heat exchanger and the indoor unit-side refrigerant flow path, and the gas-side shut-off valve is connected between the indoor unit-side refrigerant flow path and the compressor.

5. The air conditioner according to claim 1, further comprising a controller for controlling an air conditioning operation, wherein in a case where the refrigerant detection sensor detects refrigerant leakage into the room during the cooling operation, the controller is configured to stop the compressor, then close all the indoor unit-side expansion valves, then close the gas-side shut-off valve and the liquid-side shut-off valve, and then open the bypass solenoid valve.

6. The air conditioner according to claim 2, further comprising a controller for controlling an air conditioning operation, wherein in a case where the refrigerant detection sensor detects refrigerant leakage into the room during the heating operation, the controller is configured to stop the compressor, then close the gas-side shut-off valve, then close all the indoor unit-side expansion valves and the liquid-side shut-off valve, and then open the bypass solenoid valve.

7. The air conditioner according to claim 5, wherein the controller includes differential pressure calculator for calculating a high-low pressure difference of the refrigerant circuit, in a case where the high-low pressure difference calculated by the differential pressure calculator when the refrigerant detection sensor detects refrigerant leakage is less than a predetermined value, a differential pressure securing operation to operate the compressor is executed, and in a case where the high-low pressure difference is equal to or greater than a predetermined value due to the execution of the differential pressure securing operation, the compressor is stopped.

8. The air conditioner according to claim 1, wherein the liquid-side shut-off valve is connected between the outdoor heat exchanger and the indoor unit-side refrigerant flow path, and the gas-side shut-off valve is connected between the indoor unit-side refrigerant flow path and the compressor.

9. The air conditioner according to claim 2, wherein the liquid-side shut-off valve is connected between the outdoor heat exchanger and the indoor unit-side refrigerant flow path, and the gas-side shut-off valve is connected between the indoor unit-side refrigerant flow path and the compressor.

10. The air conditioner according to claim 1, further comprising a controller for controlling an air conditioning operation, wherein in a case where the refrigerant detection sensor detects refrigerant leakage into the room during the cooling operation, the controller is configured to stop the compressor, then close all the indoor unit-side expansion valves, then close the gas-side shut-off valve and the liquid-side shut-off valve, and then open the bypass solenoid valve.

11. The air conditioner according to claim 3, further comprising a controller for controlling an air conditioning operation, wherein in a case where the refrigerant detection sensor detects refrigerant leakage into the room during the cooling operation, the controller is configured to stop the compressor, then close all the indoor unit-side expansion valves, then close the gas-side shut-off valve and the liquid-side shut-off valve, and then open the bypass solenoid valve.

12. The air conditioner according to claim 4, further comprising a controller for controlling an air conditioning operation, wherein in a case where the refrigerant detection sensor detects refrigerant leakage into the room during the cooling operation, the controller is configured to stop the compressor, then close all the indoor unit-side expansion valves, then close the gas-side shut-off valve and the liquid-side shut-off valve, and then open the bypass solenoid valve.

13. The air conditioner according to claim 4, further comprising a controller for controlling an air conditioning operation, wherein in a case where the refrigerant detection sensor detects refrigerant leakage into the room during the heating operation, the controller is configured to stop the compressor, then close the gas-side shut-off valve, then close all the indoor unit-side expansion valves and the liquid-side shut-off valve, and then open the bypass solenoid valve.

14. The air conditioner according to claim 10, wherein the controller includes differential pressure calculator for calculating a high-low pressure difference of the refrigerant circuit, in a case where the high-low pressure difference calculated by the differential pressure calculator when the refrigerant detection sensor detects refrigerant leakage is less than a predetermined value, a differential pressure securing operation to operate the compressor is executed, and in a case where the high-low pressure difference is equal to or greater than a predetermined value due to the execution of the differential pressure securing operation, the compressor is stopped.

15. The air conditioner according to claim 11, wherein the controller includes differential pressure calculator for calculating a high-low pressure difference of the refrigerant circuit, in a case where the high-low pressure difference calculated by the differential pressure calculator when the refrigerant detection sensor detects refrigerant leakage is less than a predetermined value, a differential pressure securing operation to operate the compressor is executed, and in a case where the high-low pressure difference is equal to or greater than a predetermined value due to the execution of the differential pressure securing operation, the compressor is stopped.

16. The air conditioner according to claim 12, wherein the controller includes differential pressure calculator for calculating a high-low pressure difference of the refrigerant circuit, in a case where the high-low pressure difference calculated by the differential pressure calculator when the refrigerant detection sensor detects refrigerant leakage is less than a predetermined value, a differential pressure securing operation to operate the compressor is executed, and in a case where the high-low pressure difference is equal to or greater than a predetermined value due to the execution of the differential pressure securing operation, the compressor is stopped.

17. The air conditioner according to claim 7, wherein the controller includes differential pressure calculator for calculating a high-low pressure difference of the refrigerant circuit, in a case where the high-low pressure difference calculated by the differential pressure calculator when the refrigerant detection sensor detects refrigerant leakage is less than a predetermined value, a differential pressure securing operation to operate the compressor is executed, and in a case where the high-low pressure difference is equal to or greater than a predetermined value due to the execution of the differential pressure securing operation, the compressor is stopped.

18. The air conditioner according to claim 13, wherein the controller includes differential pressure calculator for calculating a high-low pressure difference of the refrigerant circuit, in a case where the high-low pressure difference calculated by the differential pressure calculator when the refrigerant detection sensor detects refrigerant leakage is less than a predetermined value, a differential pressure securing operation to operate the compressor is executed, and in a case where the high-low pressure difference is equal to or greater than a predetermined value due to the execution of the differential pressure securing operation, the compressor is stopped.

* * * * *